United States Patent
Devlin et al.

(10) Patent No.: US 6,809,548 B2
(45) Date of Patent: Oct. 26, 2004

(54) METHOD OF PROVIDING POWER TO FIELD PROGRAMMABLE GATE ARRAY MODULES

(75) Inventors: Malachy Devlin, Glasgow (GB); Allan J. Cantle, Glasgow (GB)

(73) Assignee: Nallatech, Ltd., Glasgow (GB)

( * ) Notice: Subject to any disclaimer, the term of this patent is extended or adjusted under 35 U.S.C. 154(b) by 12 days.

(21) Appl. No.: 10/699,366

(22) Filed: Oct. 30, 2003

(65) Prior Publication Data

US 2004/0093529 A1 May 13, 2004

Related U.S. Application Data

(62) Division of application No. 10/076,883, filed on Feb. 13, 2002, now Pat. No. 6,710,621.

(30) Foreign Application Priority Data

Feb. 16, 2001 (GB) ............................................. 0103837

(51) Int. Cl.[7] ........................................... H03K 19/177
(52) U.S. Cl. .......................................... 326/38; 326/80
(58) Field of Search .............................. 326/37–41, 16, 326/80

(56) References Cited

U.S. PATENT DOCUMENTS

| | | |
|---|---|---|
| 4,348,636 A | 9/1982 | Doundoulakis |
| 5,790,469 A | 8/1998 | Wong |
| 6,242,943 B1 | 6/2001 | El-Ayat |
| 6,351,827 B1 | 2/2002 | Co et al. |
| 6,625,073 B1 | 9/2003 | Beffa |
| 2002/0049941 A1 | 4/2002 | Lunde et al. |

OTHER PUBLICATIONS

"EL7556BC Integrated Adjustable 6 Amp Synchronous Switcher," Elantec Semiconductor, Inc. data sheet, Aug. 30, 2000, pp. 1–13.

(List continued on next page.)

*Primary Examiner*—Don Le
(74) *Attorney, Agent, or Firm*—Townsend and Townsend and Crew LLP

(57) ABSTRACT

A module standard for FPGAs is provided in which power supply voltages for daughtercards are not fixed in advance. Instead programmable power supplies are provided and a method is provided in which each daughtercard can specify the required power supply voltage. Thus, unlike prior-art systems, this modular system is backward and forward compatible with FPGA chips from many process generations allowing easy upgrading as new FPGA families become available. A motherboard or baseboard for use with this invention includes a plurality of module connectors into which compatible modules or "daughtercards" can be plugged and a plurality of programmable power supplies. In a preferred embodiment there are four sets of module connectors and sixteen programmable power supplies. This allows each module to have four independently specifiable power supply voltages. A module may also connect several power supplies together in order to obtain higher current at a single voltage. Various schemes are described to ensure that the programmable power supplies will never deliver too high a voltage to the components on the modules.

15 Claims, 14 Drawing Sheets

OTHER PUBLICATIONS

Devlin, Malachy, et al., "DIME—The first module standard for FPGA based High Performance Computing," Proceedings of FPL'99, Glasgow, UK Sep. 1999, published as Springer LNCS 1673, 6 pages.

"MAX4598 Low–Voltage, Combination Single–Ended 8–to–1/Differential 4–to–1 Multiplexer," Maxim Integrated Products data sheet, Oct. 1998, pp. 1–12.

"DIME Module, Physical Level 0 Specification—Issue 4 NT301–0001," Nallatech Ltd. data sheet, Nov. 23, 2000, pp. 1–21.

"Distributed DSP Processing, Level 1 Implementation of the DIME Module Standard NT301–0002," Nallatech Ltd. data sheet, Apr. 22, 1999, pp. 1–13.

"Virtex™–E 1.8 V Field Programmable Gate Arrays," Xilinx DS022 (v 1.2) Advance Product Specification, Jan. 28, 2000, pp. 1–190.

METHOD OF PROVIDING POWER TO FIELD PROGRAMMABLE GATE ARRAY MODULES

CROSS-REFERENCES TO RELATED APPLICATIONS

This application is a division of U.S. patent application Ser. No. 10/076,883, filed Feb. 13, 2002, now U.S. Pat. No. 6,710,621, which claims priority to United Kingdom patent application number 0103837.1, filed Feb. 16, 2001, which is incorporated by reference along with all other references cited in this application.

BACKGROUND OF THE INVENTION

This invention relates to modular computing systems based on integrated circuits such as field programmable gate arrays (FPGAs) which have complex and application dependent power supply requirements.

Modular systems are well known in the electronics industry. By defining a standardized mechanical and electrical interface to a printed circuit board manufactures and industry groupings guarantee compatibility between products from various vendors. Successful module standards attract large numbers of companies who provide a wide range of compatible modules. System integrators benefit by being able to mix-and-match from these modules to create an end system tailored to customer requirements. Commonly available modules include processing (for example, cards containing microprocessors and digital signal processors or DSPs), video capture, video display, digital-to-analog (D-to-A) conversion, and network connection. By making use of these off-the-shelf devices system integrators greatly reduce their engineering costs and can bring a product to market faster. Examples of successful module formats include the TRAM format proposed by INMOS for Transputer-based systems, Texas Instrument's TIM40 format for digital signal processor (DSP) chips, Analog Devices SHARCPAC format for DSP chips and the PCI mezzanine card format.

Prior-art modular formats have been defined around the requirements of conventional microprocessors and digital signal processors. This naturally leads to bus based architectures which distribute address, data, and control signals from the processor or processors with or without additional point to point communicating sequential processes (CSP) links. Recently, field programmable gate arrays (FPGAs) have been making considerable inroads into the signal processing marketplace. FPGAs operate by implementing algorithms directly in reconfigurable logic gates: the functionality and interconnection of the logic gates is defined by a control memory which can be reprogrammed as required. With FPGAs there is no fixed bus based communications mechanism: instead programmable input/output blocks (IOBs) are configured to implement exactly those connections required by the application currently programmed onto the FPGA. Therefore, whereas a module standard for DSPs specifies the semantics of various signals on a bus a module standard based on FPGAs' needs to deliver "raw" digital connections between modules the semantics of which will be determined only once the FPGAs have been programmed. A module standard developed specifically for FPGAs by Nallatech Ltd., the assignee of the present invention is disclosed in the paper "DIME—The first module standard for FPGA Based High Performance Computing" by Malachy Devlin and Allan Cantle in Proceedings of FPL'99, Glasgow, UK September 1999, published as Springer LNCS 1673 which is incorporated by reference.

The product documents "DIME Module, Physical Level 0 Specification," part no. NT-301-0001 and "Video Processing, implementation Level 1 of the DIME Module," NT301-0002 (both available from Nallatech Ltd., Boolean House, One Napier Park, Cumbernauld, Glasgow G68 OBH, United Kingdom) provide more detailed information on the DIME modules and are incorporated by reference.

As silicon technology scales it is becoming necessary to change the power supply voltage for integrated circuits with each process shrink. For example, 0.5-micron line width integrated circuits generally operated off 5-volt supplies, 0.35-micron integrated circuits from 3.3-volt supplies, 0.25-micron integrated circuits from 2.5-volt supplies, and the present generation of 0.18-micron circuits from 1.8-volt supplies. Since a system is normally built from many different types of integrated circuits supplied by different vendors it is very likely that there will be multiple power supplies required and multiple voltage level standards for interchip signaling. It has become increasingly common for integrated circuits to operate their input/output pins at different voltage levels from their "core" internal circuitry-this allows them to take advantage of improved process technology to increase performance while remaining compatible with older chip's signaling voltages.

Intel Corporation reacted to the need for reducing power supply voltage as process technology improves by specifying an interface between a microprocessor and a programmable power supply as shown in FIG. 1. This allowed the microprocessor to specify the power supply voltage it required. One advantage of this technology was that personal computer motherboards could be upgraded with newer processors operating off a lower power supply voltage.

An additional trend in the industry has been an explosion in the number of electrical signaling standards used to communicate between digital chips. For many years only the transistor-transistor-logic (TTL) and complementary metal oxide semiconductor (CMOS) standards were of interest—and it was easy to convert between them. Today there are many different significant standards including TTL, CMOS, low voltage differential signaling (LVDS), low voltage positive emitter coupled logic (LVPECL), and gunning transceiver logic (GTL).

FPGA manufacturers have reacted to these problems by designing complex I/O structures which are "backwardly-compatible" with previous generations of process technology and can be programmed to support many different signaling standards. This has allowed FPGAs to become the "universal connectors" at the board level which speak the signaling language of all the components in the system. The signaling standards and power supply requirements of a leading advanced FPGA family are described in "Virtex-E 1.8V Extended Memory Field Programmable Gate Array's" Preliminary Product Specification, DS025 v1.2, Sep. 19, 2000 published by Xilinx Inc. which is incorporated by reference.

As shown in FIG. 2, modern FPGAs such as Virtex-E require multiple power supply voltages. As well as the "core" power supply voltage groups or "banks" of I/O pins can operate independently at different voltage levels. Some signaling schemes also require a "reference" voltage to set the threshold at which logical ones and zeros are recognized. More details on these aspects are found in the Xilinx product specification referenced above.

Prior art module standards have not addressed the need for multiple electrical signaling standards or the requirement for modules to operate off different supply voltages. In fact, one of the basic goals of prior-art modular standards is to specify the electrical signaling standards in great detail to guarantee compatibility. This is no longer necessary given FPGAs support for multiple signaling standards.

SUMMARY OF THE INVENTION

In the present invention a module standard for FPGAs is provided in which power supply voltages for daughtercards are not fixed in advance. Instead programmable power supplies are provided and a method is described by which each daughtercard can specify the required power supply voltage. Thus, unlike prior art systems, this modular system is backward and forward compatible with FPGA chips from many process generations allowing easy upgrading as new FPGA families become available.

A motherboard or baseboard for use with this invention includes a plurality of module connectors into which compatible modules or "daughtercards" can be plugged and a plurality of programmable power supplies. In a preferred embodiment there are four sets of module connectors and sixteen programmable power supplies. This allows each module to have four independently specifiable power supply voltages. A module may also connect several power supplies together in order to obtain higher current at a single voltage. Various schemes are described to ensure that the programmable power supplies will never deliver too high a voltage to the components on the modules.

In the context of this disclosure "motherboard" or "baseboard" is used to denote a printed circuit board, which may be of a standard format such as Double Eurocard, into which smaller "daughtercards" or "modules" can be plugged. It will be understood that there may be a hierarchy of "motherboards" and "daughterboards" in a system. In particular, it is likely that the motherboard itself will have connectors allowing it to be plugged into a backplane bus of some type (for example VME bus in industrial equipment or PCI bus in a personal computer). In the future the teachings of this invention may be applied to module standards with additional levels of motherboard/daughterboard hierarchy: for example, the daughterboards themselves may act as motherboards for even smaller daughterboards.

Although this invention is most suited for use with field programmable gate array (FPGA) chips such as those supplied by Xilinx Inc. and Altera Corp., it will be apparent to one skilled in the art that aspects of it could be used with many other classes of programmable devices, for example complex programmable logic devices (CPLDs) or programmable microprocessor peripherals. Recently, companies operating in the programmable logic industry such as Chameleon Systems Inc. have been introducing devices which combine aspects of processors and programmable logic: this invention is equally applicable to such new devices. The invention may also be applied to "system on a chip" devices containing programmable logic and components such as microprocessors.

According to one embodiment, this invention provides a flexible modular standard for implementing digital systems using FPGAs. In further embodiment of this invention provides support for the complex power supply requirements of modern FPGAs. The invention also provides support for systems built from FPGAs and other components with differing power supply requirements.

Among the advantages of a preferred embodiment of this modular system are: (1) New FPGAs using a more modern process technology and a corresponding lower core power supply voltage are compatible with previous systems allowing users to take advantage of their increased density and performance. (2) The modular daughtercards remain simple and relatively low cost since programmable power supplies are provided on the baseboard. This makes upgrading the system more cost effective.

In one embodiment, the invention is an electronic system including a module connector with a first programmable voltage line, second programmable voltage line, and power control signal line. A first programmable voltage supply is coupled to the first programmable voltage line of the module connector, where based on a signal received at a first control input of the first programmable voltage supply, the first programmable voltage supply generates a voltage on the first programmable voltage line. A second programmable voltage supply is coupled to the second programmable voltage line of the module connector, where based on a signal received at a second control input of the second programmable voltage supply, the second programmable voltage supply generates a voltage on the second programmable voltage line. A power controller block is coupled to the power control signal line of the module connector, where based a signal on the power control signal line, the power controller block generates signals for the first and second control inputs.

In another embodiment, the invention is an electronic system including a module connector with a first programmable voltage line, second programmable voltage line, and at least one power control signal line. A first programmable voltage supply is coupled to the first programmable voltage line of the module connector, where based on a signal on the power control signal line, the first programmable voltage supply generates a voltage on the first programmable voltage line. A second programmable voltage supply is coupled to the second programmable voltage line of the module connector, where based on a signal on the power control signal line, the second programmable voltage supply generates a voltage on the second programmable voltage line.

In another embodiment, the invention is an electronic system including a first module connector with a first programmable voltage line, second programmable voltage line, and first power control signal line. A first power supply unit includes a first programmable voltage supply, connected to the first programmable voltage line of the first module connector, where based on a signal on the first power control signal line, the first programmable voltage supply generates a voltage on the first programmable voltage line. The first power supply unit includes a second programmable voltage supply, connected to the second programmable voltage line of the first module connector, where based on a signal on the first power control signal line, the second programmable voltage supply generates a voltage on the second programmable voltage line. A second module connector includes a third programmable voltage line, fourth programmable voltage line, and second power control signal line. A second power supply unit includes a third programmable voltage supply, connected to the third programmable voltage line of the second module connector, where based on a signal on the second power control signal line, the first programmable voltage supply generates a voltage on the third programmable voltage line. The second power supply unit includes a fourth programmable voltage supply, connected to the fourth programmable voltage line of the second module connector, where based on a signal on the second power control signal line, the second programmable voltage supply generates a voltage on the fourth programmable voltage line.

In another embodiment, the invention is an electronic system including an integrated circuit connector with a first programmable voltage line, second programmable voltage line, and power control signal line, where an integrated circuit connected to the integrated circuit connector will be electrically connected to receive voltages from the first and second programmable voltage lines. A first programmable voltage supply is connected to the first programmable voltage line of the integrated circuit connector, where based on a signal received at a first control input of the first programmable voltage supply, the first programmable voltage supply generates a voltage on the first programmable voltage line. A second programmable voltage supply is connected to the second programmable voltage line of the module connector, where based on a signal received at a second control input of the second programmable voltage supply, the second programmable voltage supply generates a voltage on the second programmable voltage line. A power controller block is connected to the power control signal line of the integrated circuit connector, where based on a signal received from the integrated circuit coupled to the integrated circuit connector on the power control signal line, the power controller block generates signals for the first and second control inputs.

In another embodiment, the invention is an electronic module including a connector to connect to an electronic system board, where the connector includes a supply voltage line and ground supply voltage line to connect to voltage sources provided by electronic system board. An integrated circuit is connected to a first programmable voltage line, second programmable voltage line, and power control signal line. A first programmable voltage supply is connected to the supply voltage line, ground supply voltage line, and the first programmable voltage line of the integrated circuit, where based on a signal received at a first control input of the first programmable voltage supply, the first programmable voltage supply generates a voltage on the first programmable voltage line. A second programmable voltage supply is connected to the supply voltage line, ground supply voltage line, and the second programmable voltage line of the module connector, where based on a signal received at a second control input of the second programmable voltage supply, the second programmable voltage supply generates a voltage on the second programmable voltage line. A power controller block is connected to the supply voltage line, ground supply voltage line, and power control signal line of the integrated circuit connector, where based on a signal received from the integrated circuit connected to the integrated circuit connector on the power control signal line, the power controller block generates signals for the first and second control inputs.

In another embodiment, the invention is a method of operating an electronic system having an integrated circuit requiring a plurality of operating voltages. A signal is provided from the integrated circuit to power controller circuitry. The signal is decoded using the power controller circuitry and first and second control signals are generated. The first control signal is received in a first programmable voltage generator, which generates a first voltage. The second control signal is received in a second programmable voltage generator, which generates a second voltage, different from the first voltage. The first and second voltages are provided to the integrated circuit.

In another embodiment, the invention is a method of operating an electronic system. A first module, having a master integrated circuit, is connected to the electronic system. A second module, having a slave integrated circuit, is connected to the electronic system. A common communication standard is determined to be usable by both the master and slave integrated circuits. Data is transferred from the master integrated circuit to a first programmable power supply to generate voltages for to configure the master integrated circuit to use the common communication standard. Data is transferred from the slave integrated circuit to a second programmable power supply to generate voltages to configure the slave integrated circuit to use the common communication standard.

In another embodiment, the invention is a method of operating an electronic system. A master integrated circuit is connected to the electronic system. A first module, having a first slave integrated circuit, is connected to the electronic system. A common communication standard is determined to be usable by both the master and first slave integrated circuits. Data is transferred from the master integrated circuit to a first programmable power supply to generate voltages for to configure the master integrated circuit to use the common communication standard. Data is transferred from the first slave integrated circuit to a second programmable power supply to generate voltages to configure the first slave integrated circuit to use the common communication standard.

In another embodiment, the invention is a method of operating an electronic system having a first integrated circuit requiring a plurality of operating voltages. A signal is provided from a second integrated circuit to power controller circuitry. The signal is decoded using the power controller circuitry and generating first and second control signals. The first control signal is received in a first programmable voltage generator, which generates a first voltage. The second control signal is received in a second programmable voltage generator, which generates a second voltage, different from the first voltage. The first and second voltages are provided to the first integrated circuit.

Other objects, features, and advantages of the present invention will become apparent upon consideration of the following detailed description and the accompanying drawings, in which like reference designations represent like features throughout the figures.

DETAILED DESCRIPTION

In the following description, for the purposes of explanation, specific numbers, materials, component part numbers, and configurations are described in order to provide a thorough understanding of the invention. However, it will be apparent to one skilled in the art that the present invention may be practiced without the specific details. In other instances, well known features are omitted or simplified in order not to obscure the present invention.

Programmable Power Supply for FPGA

Figure 1:
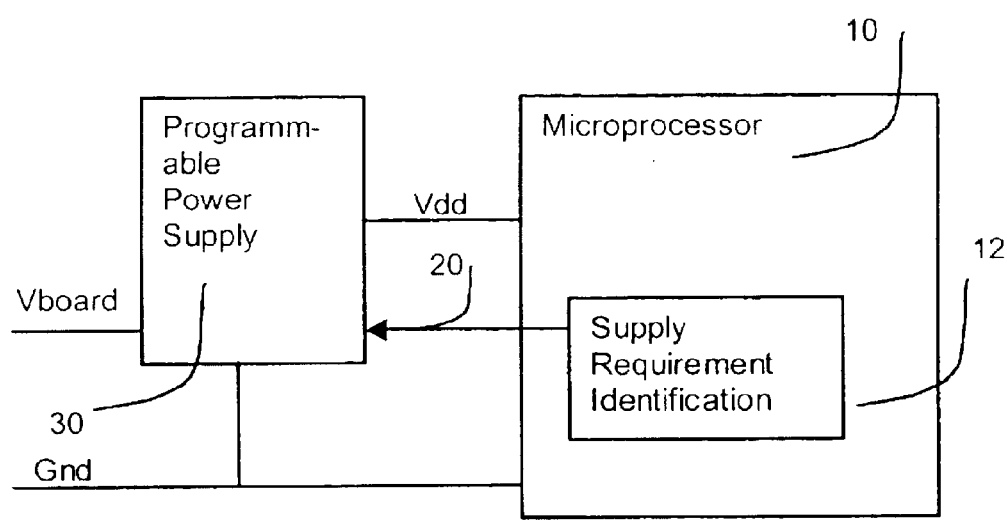
FIG. 1 shows a microprocessor which includes circuitry for controlling an associated power supply.
Figure 2:
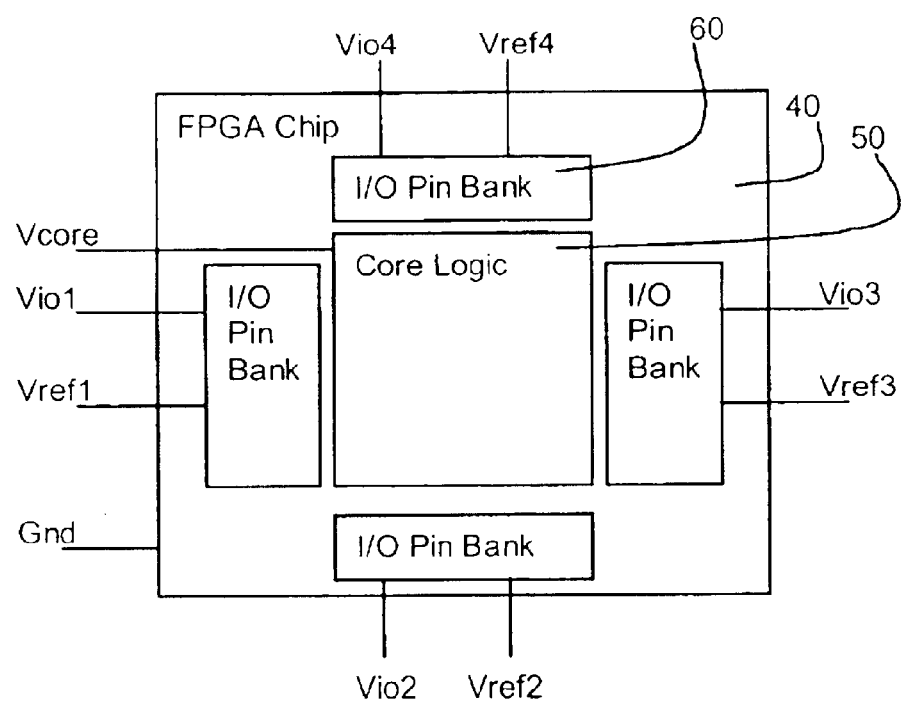
FIG. 2 shows the complex power supply and reference voltage requirements of a FPGA.
Figure 3:
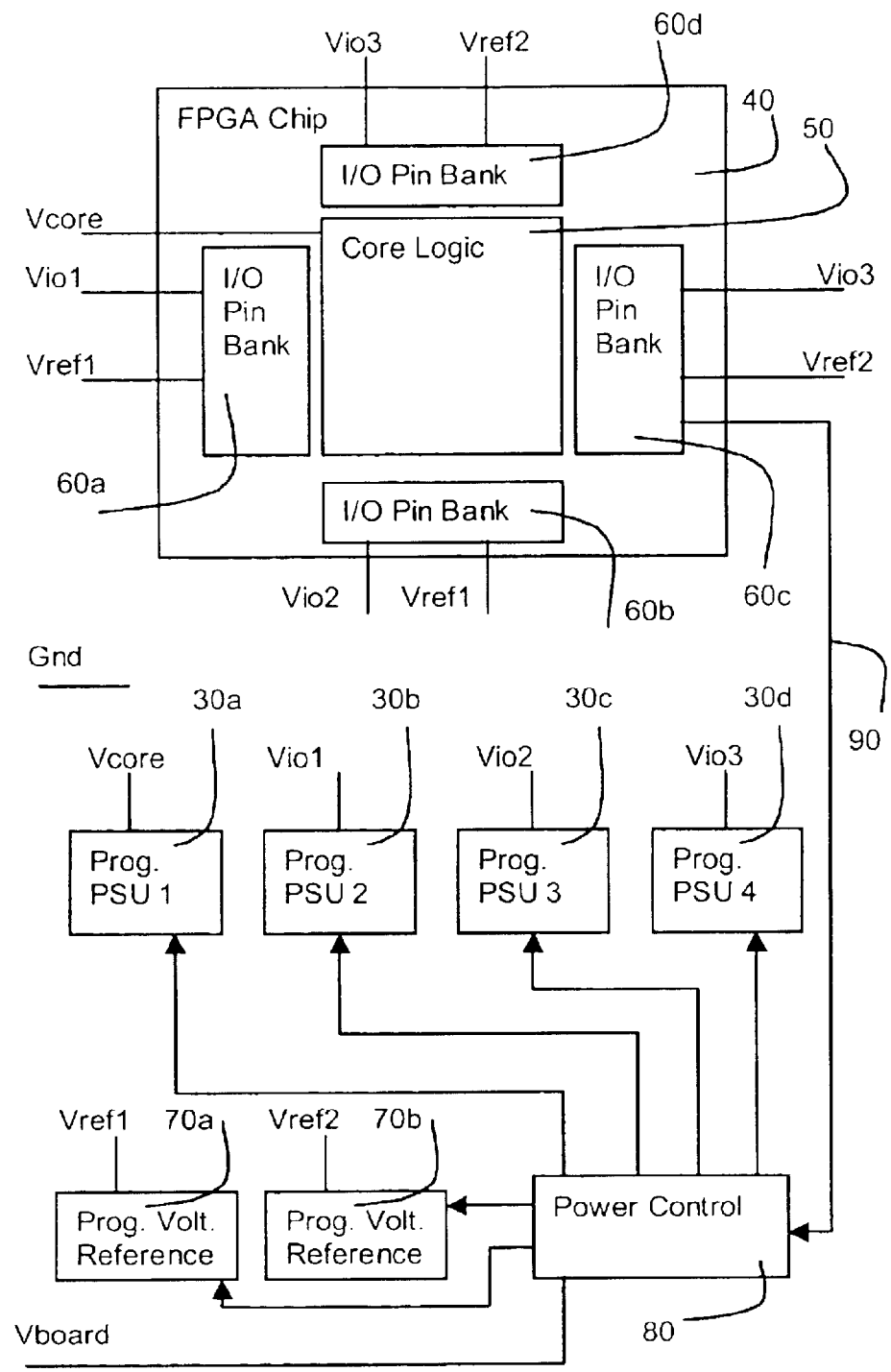
FIG. 3 shows an arrangement of power supplies for an exemplary FPGA according to this invention.

FIG. 3 shows one embodiment of a programmable power supply for FPGA chips according to this invention. Although described with respect to FPGAs and programmable logic, the invention may be applied, with the appropriate modifications, to other types of integrated circuits including memories, ASICs, microprocessors, and controllers, as well as combinations of these. FPGAs and programmable logic is also sometimes referred to as programmable logic devices (PLDs), programmable array logic devices (PALs), and programmable logic arrays (PLAs), just to name a few.

Programmable logic integrated circuits include logic that is user-programmable to implement logical functions. These functions may include look-up tables, AND-OR and other logic gates, registered or sequential logic, and others. Programmable logic integrated circuits may also include memory for storage of data. Typically, a user programs the programmable logic of a chip by configuring the memory cells of the chip. These memory cells are commonly static RAM or SRAM cells, or may also be nonvolatile cells such as Flash or EEPROM cells. Programmable logic is field programmable, which means these chips may be programmed by the user, not at the factory (e.g., by mask changes) such as a gate array or other ASIC.

Furthermore, the invention may also be applied to system-on-a-chip (SOC) implementations, and in particular programmable systems-on-a-chip (PSOC). In short, in a system-on-a-chip, different types of integrated circuits are combined onto a single chip. And for a programmable system-on-a-chip, different types of integrated circuits are combined with an FPGA. For example, the invention may be used with integrated circuits including a programmable logic portion. In addition, to the programmable logic portion, the integrated circuit may include a microcontroller, controller, processor, mircoprocessor, or CPU portion. And as miniaturization of integrated circuits continues, programmable systems-on-a-chip will include greater and greater functionality in addition to the FPGA or programmable logic portion.

Referring to FIG. 3, power supply inputs, Vcore, Vio1, Vio2, and Vio3 of FPGA chip 40 are coupled to programmable power supplies 30*a*, 30*b*, 30*c*, 30*d*. Reference voltage inputs Vref1 and Vref2 are coupled to programmable voltage references 70*a* and 70*b*. Preferably, because the current requirement on reference voltages is not as high as that on power supplies programmable voltage references are implemented using digital-to-analog converters. Banks of I/O pins 60*c* and 60*d* share a common I/O power supply voltage Vio3, banks of I/O pins 60*a* and 60*b* share a common reference voltage Vref1, banks of I/O pins 60*c* and 60*d* share a common reference voltage Vref2. This sharing of voltages between pins is merely an illustration of one possibility. Another possibility which offers more flexibility would be to associate each of the four FPGA I/O power pins with a dedicated power supply. Sharing power supplies and reference voltages between multiple banks is desirable since it reduces the number of power supplies required. Although this illustration shows only one FPGA, systems with multiple FPGAs are possible and likely in practice. In the case of multiple FPGAs it is likely that the FPGAs will have similar core and I/O voltage requirements and therefore will be able to share power supply and reference voltages.

Power control circuitry 80 is coupled to the individual power supplies and reference voltage generators for setting their output voltages. Unlike Intel microprocessors, present SRAM-based FPGA chips do not have on-chip circuits to control programmable power supplies, therefore this function has to be provided externally. Power control circuitry 80 is preferably coupled to and obtains power from the board power supply Vboard, thus it can operate independently of the programmable power supplies. Future FPGA chips may incorporate power control circuitry according to the teachings of this invention. In particular, it would be straightforward and desirable to include the digital-to-analog (D/A) converters 70*a* and 70*b* and the power control circuitry 80 on the FPGA chips. Some elements of the programmable power supplies might also be included on the FPGA, although the higher currents involved make it problematic to integrate the entire power supply on chip.

Feedback signal 90 from FPGA chip 40 to power control circuit 80 allows the "user" design loaded on FPGA chip 40 after configuration to take control of the power supply voltages to the FPGA. This would allow selection of appropriate I/O voltages "in the field" according to the system environment into which the FPGA module finds itself. This topic is discussed in more detail in a subsequent section of this disclosure.

In order to maintain clarity in FIG. 3, several sets of connections are not shown. Vboard is coupled to and powers the individual power supplies and reference voltage generators. The ground signal (Gnd) is coupled to the FPGA chip, the power supplies, the reference voltage generators and the power control circuitry. As is standard practice some connections, for example the connection between the output of programmable power supply 30*b* and the Vio input of I/O pin bank 60*a* is indicated by the common net label Vio1, are indicated by assigning common net labels to the signals involved rather than drawing explicit connections.

When power is applied to the equipment the power supply voltage Vboard will reach its nominal value. In one embodiment Vboard is 5 volts, however many other values are possible. In some cases multiple Vboard voltages will be provided to the board. In some cases an additional stage of voltage regulation might be provided on the board: for example an external 5-volt voltage might be used by an on board regulator to create a 3.3-volt supply which is used by the programmable power supplies to create a 1.8-volt supply for use by an FPGA. Usually, Vboard will be significantly higher than the FPGA core power supply voltage Vcore. Power control circuitry 80 is powered directly by Vboard and becomes active. It is important that the programmable power supplies and reference voltage generators never output voltages which would damage FPGA 40. Therefore, programmable PSUs 30*a*–30*d* and reference voltage generators 70*a* and 70*b* are designed so that they are inactive or output a minimal voltage until they receive valid control signals from power control circuitry 80.

Power control circuitry 80 includes or has associated with it nonvolatile memory in which the correct operating voltages for the various power supplies can be stored. In its simplest form this nonvolatile memory could be a set of physical traces on the printed circuit board or a set of DIP switches on the board. Preferably, power control circuitry 80 is implemented as a complex programmable logic device (CPLD) based on nonvolatile Flash erasable programmable read-only memory (EPROM) technology, in which case no separate nonvolatile memory is needed.

In an embodiment power control circuitry specifies the output voltage of each programmable power supply using a separate four-bit control word. This allows one of 16 possible power supply output voltages to be selected. Four-bit words are also used to control digital-to-analog converters in the programmable reference voltage generators. It will be obvious to one skilled in the art that a different number of control bits might be appropriate according to the chips chosen to implement the reference voltage generators.

Once the core power supply voltage and the I/O supply voltage for those pins of FPGA 40 coupled to the power control circuitry and those pins of FPGA 40 required to load configuration bitstreams are established FPGA 40 can be configured with a user design. Preferably this is done through a standard JTAG interface however many other options are possible. Methods of configuring SRAM-programmed FPGAs are detailed in FPGA manufacturer literature such as the Xilinx Virtex-E datasheet and are well known to those skilled in the art.

Power Supply on Daughterboard

Figure 4:
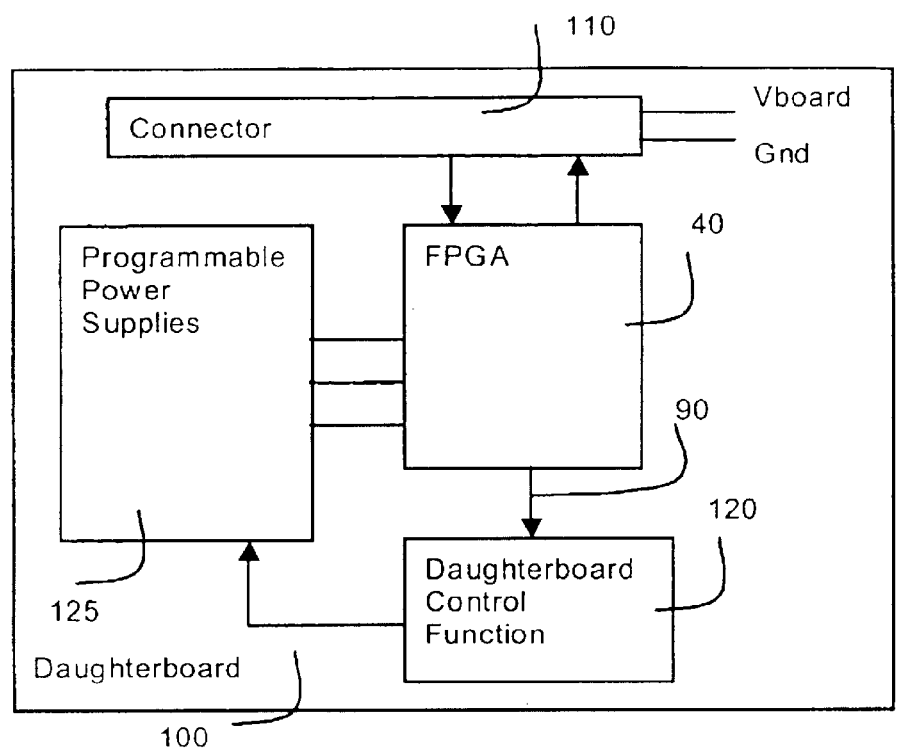
FIG. 4 shows a modular daughter board containing programmable power supplies for use with FPGAs.

FIG. 4 shows a second embodiment of the present invention in which a modular daughterboard contains programmable power supplies for the use of an FPGA located on the daughterboard. Daughterboard 100 receives a standard power supply voltage Vboard from the motherboard and produces the supply voltages required by the FPGA 40 from this voltage using programmable power supplies 125. Programmable power supplies 125 will preferably contain a plurality of programmable power supply units and programmable reference voltage units as shown in FIG. 3.

Connector 110 plugs into a slot on a baseboard (not shown in FIG. 4) and connects data and control signals and power supplies from the larger system onto daughterboard 100. Arrows on data and control connections indicate the direction of information transfer. No arrows are drawn on connections that transfer power supplies and reference voltages.

Daughterboard control function 120 is preferably coupled to and powered by supply voltage Vboard in order that it can operate independently of local power supplies 130.

Power Supply on Motherboard

Figure 5:
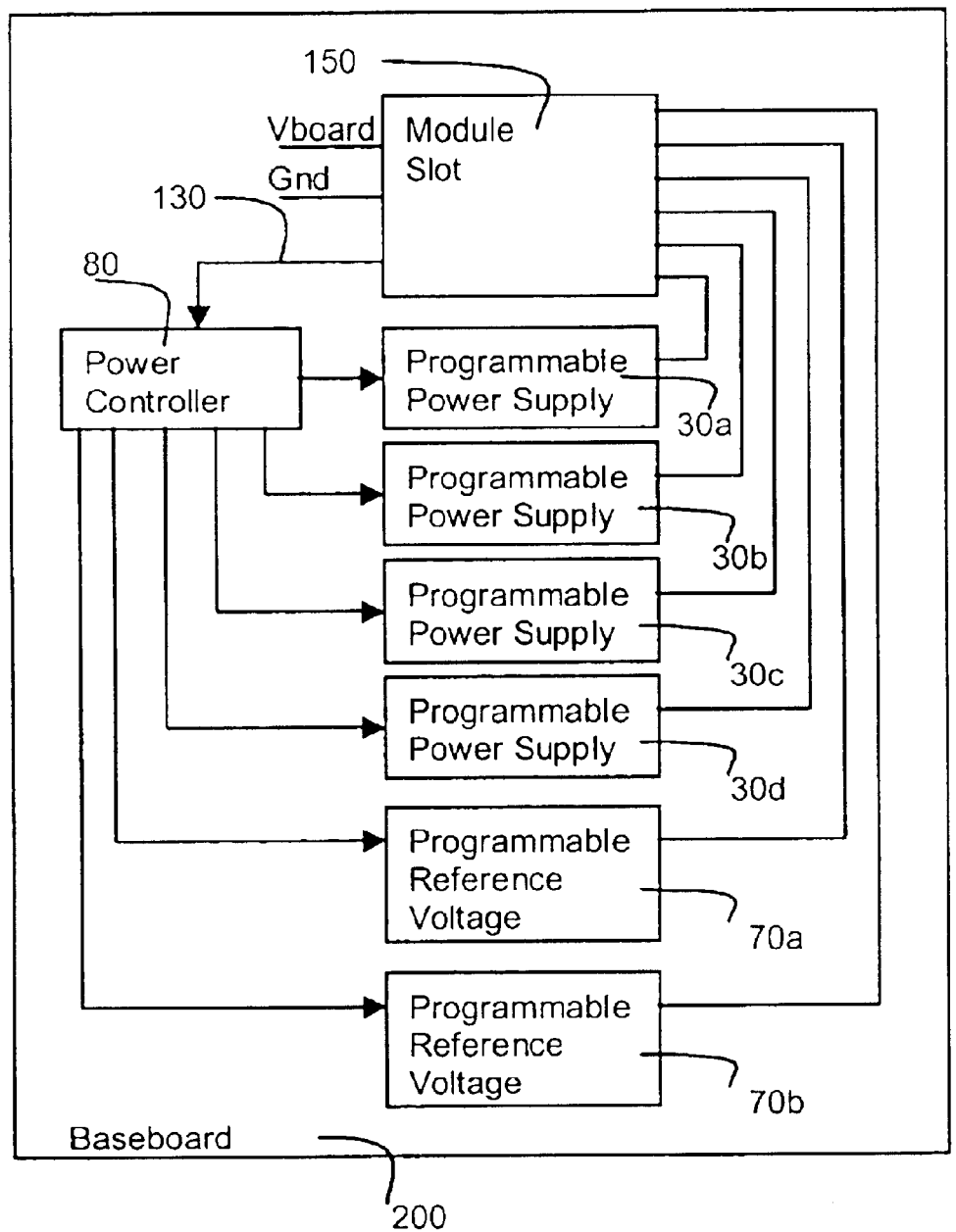
FIG. 5 shows a first baseboard containing programmable power supplies for use with modular boards containing FPGAs.

FIG. 5 shows the motherboard in an embodiment of this invention in which the programmable power supplies are moved from daughterboard 100 onto motherboard 200. Placing the power supplies on the motherboard is mechanically convenient since it allows daughterboards to have smaller area and require less vertical height. It also reduces the price of the daughterboard and reduces the complexity of daughterboard design. In a successful modular standard many companies will design daughterboards but only a few companies will produce baseboards so this is an important advantage. This partitioning also makes upgrading daughterboards with newer higher performance FPGAs as they become available more cost effective.

Figure 6:
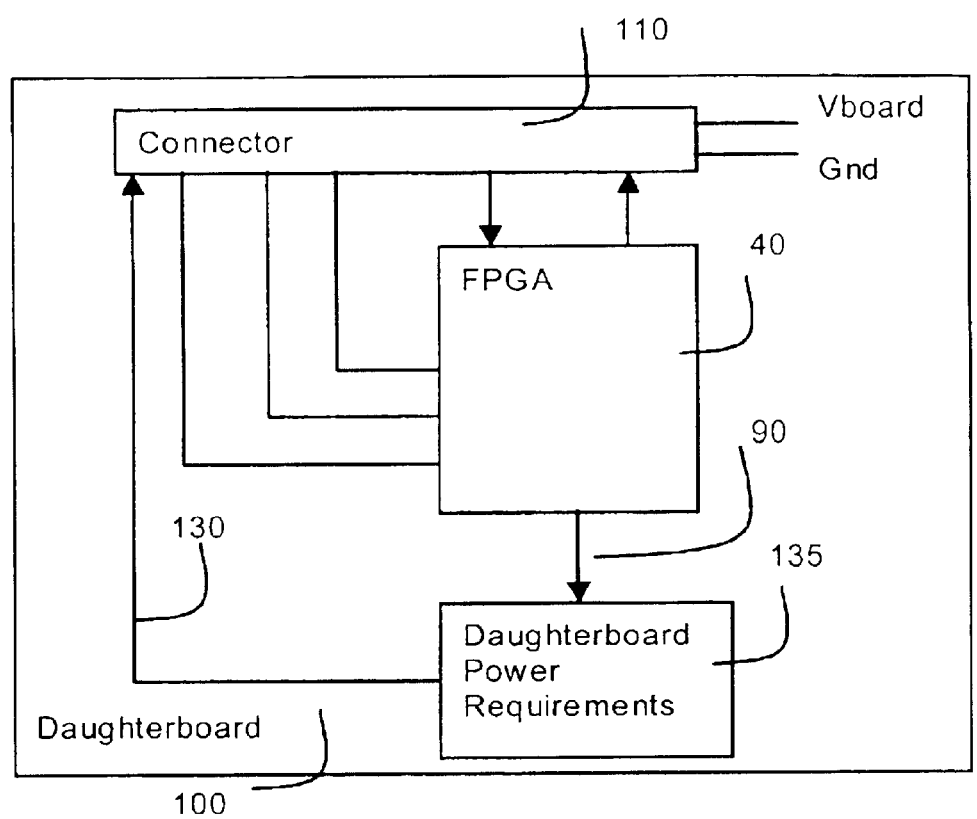
FIG. 6 shows a second daughter board for use with a baseboard containing programmable power supplies.

FIG. 6 shows the daughterboard for use with the motherboard of FIG. 5. Connector 110 on daughterboard 100 is inserted into module slot 150 on motherboard 200 so that power supply, data, and control signals from the baseboard are coupled to circuitry on the daughterboard. Since modern SRAM-based FPGAs do not presently contain power requirements indication circuitry, a separate daughterboard power requirements circuit 135 is provided. In one embodiment this is implemented by using a serial EPROM chip to store information on power supply requirements: this information is then read out by control circuitry on the baseboard which then programs the power supplies to output the appropriate voltages. In another embodiment this is implemented as a set of DIP switches or jumper links. The jumper link embodiment has the advantage of not requiring a power supply—so in this case supply Vboard may not be necessary. The serial EPROM implementation has the advantage of making more efficient use of connector pins since a large amount of data can be transferred serially over a single connection whereas the jumper link solution requires one connection per bit. In a future embodiment a logic device or microcontroller may be used to implement this function: in this case the power requirements circuit 135 can react to requests from the FPGA 40 passed over connection 90 and relay them to the programmable power supplies on the motherboard via connection 130. This allows the user design on the FPGA to take control of control its own power supplies, this subject is the topic of a subsequent section in this disclosure.

On the motherboard programmable power supplies 30*a*, 30*b*, 30*c*, and 30*d*, and programmable voltage references 70*a* and 70*b* deliver power to the daughtercard plugged into module slot 150. Motherboard power supply voltage Vboard and motherboard ground Gnd are also connected to the daughterboard. Daughterboard power requirements circuitry 135 produces one or more control signals 130 which are coupled to the power controller on the motherboard. In an embodiment, in order to reduce the number of control signal lines 130, the control signal 130 may be a serial data interface. A series or string of bits is passed from the daughterboard to the power controller. These signals specify the appropriate supply voltages to be generated by the programmable power supplies for the circuitry on the daughtercard. Thus the actual power supply voltages produced by the circuitry on the motherboard will vary according to the daughtercard currently plugged into the module slot.

In one embodiment of the invention, power controller 80 is omitted and control signals 130 from the daughterboard are passed directly to the power supplies. In the preferred embodiment separate motherboard power controller 80 is provided to ensure that the power supplies are turned off if the daughtercard is faulty or incorrectly inserted or the slot is empty. Preferably control circuitry 80 communicates with daughter board power requirements circuitry 135 using a serial interface in order to minimize the number of connector pins required to support programming the power supplies. For example, a series of binary bits is passed from the daughtercard to the programmable supplies or references.

Figure 7:
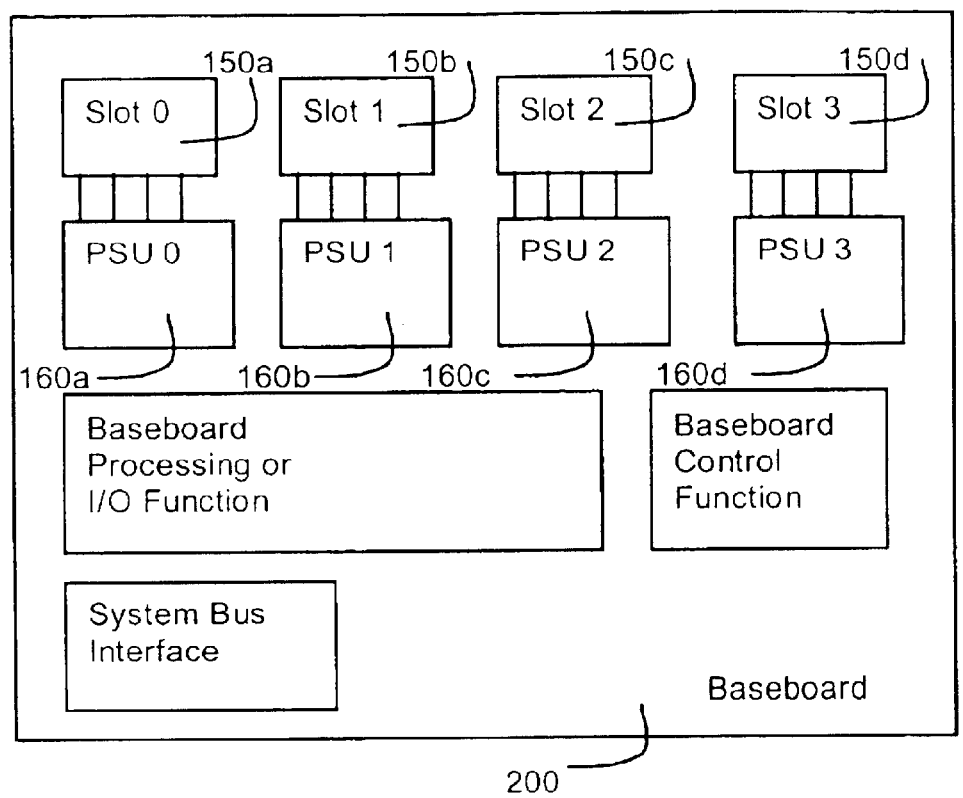
FIG. 7 shows a second baseboard containing programmable power supplies for use with modular boards containing FPGAs.

FIG. 7 shows a preferred embodiment of the invention in which motherboard 200 includes multiple daughterboard slots 150*a*, 150*b*, 150*c*, and 150*d*, and their associated power supplies 160*a*, 160*b*, 160*c*, and 160*d*. Each power supply 160*a*, 160*b*, 160*c*, and 160*d* includes power controller, programmable power supply and programmable reference voltage circuitry as shown in FIG. 5. Baseboard 200 will normally also includes circuitry not directly related to the power supplies such as processing and I/O functions, control functions and an interface to the system bus (e.g., PCI or VME bus). A series or string of bits may be passed from the daughtercard to the power controller.

In the above embodiments, the data signal (which may be in serial form) communicated to the power controller comes from the same integrated circuit which will be receiving the selected supply voltage. However, in alternative embodiments, the data signal provided to the power controller circuit may come from a first integrated circuit, different from a second integrated circuit receiving the voltage from the programmable voltage supply generator. The first integrated circuit may include a programmable read-only memory (PROM), erasable programmable read-only memory (EPROM), electrically erasable programmable read-only memory (EEPROM), serial EEPROM, random access memory (RAM), dynamic random access memory (DRAM), or static random access memory (SRAM).

Programmable Power Supply

Figure 8:
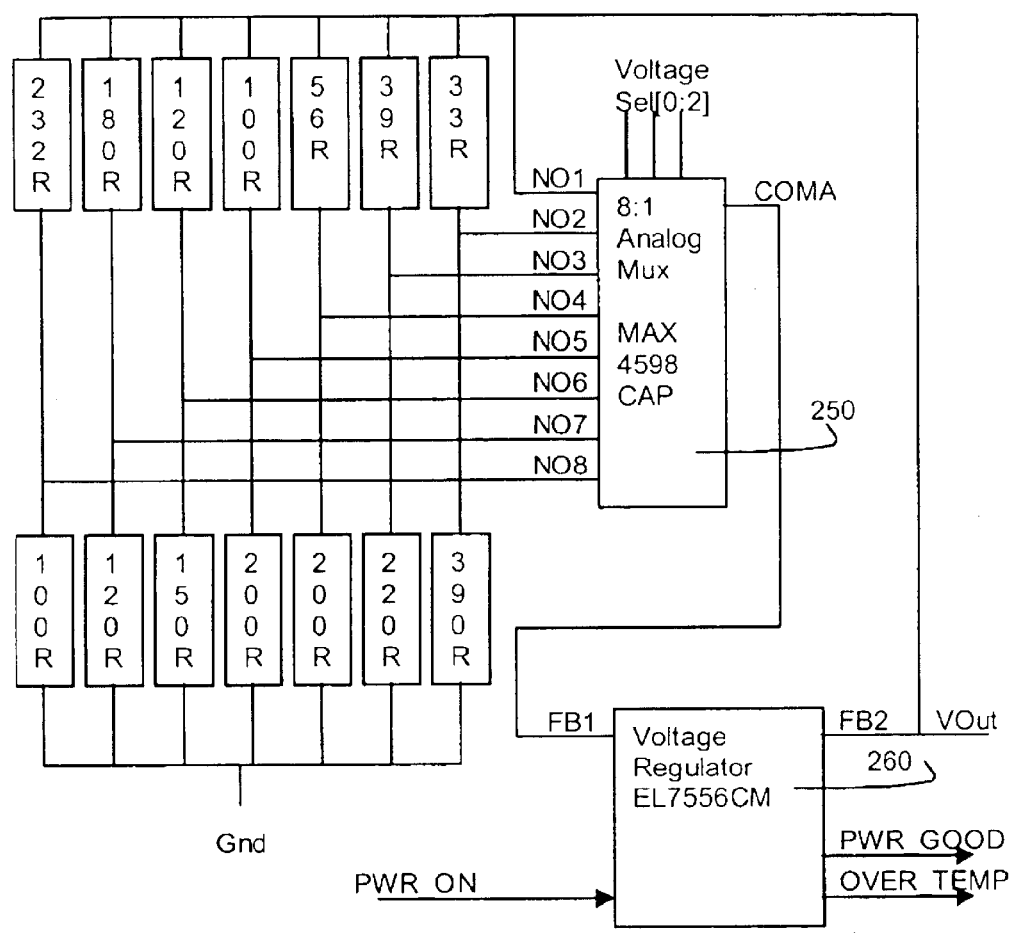
FIG. 8 shows a programmable power supply for use with modular boards containing FPGAs.

FIG. 8 shows a preferred embodiment of a programmable power supply for use with this invention. This embodiment makes use of the EL7556BC DC-to-DC converter from Elantec Inc. The following Elantec documents describe this component and its usage: "Designing a High Efficiency DC-DC Converter with the EL75XX," Application Note 18 and "EL7556BC, Integrated Adjustable 6 Amp Synchronous Switcher," Aug. 30, 2000 (both available from Elantec Semiconductor, Inc., 675 Trade Zone Blvd., Milpitas Calif. 95035, USA) are incorporated by reference. It will be appreciated that although this Elantec component is preferred there are many DC—DC converter chips available on the market from various vendors and the teachings of this invention may be applied using different components.

FIG. 8 is best understood in conjunction with the connection diagram on the first page of the Elantec EL7556BC datasheet mentioned above. In particular the fixed resistors R3 and R4 in the Elantec diagram control the output voltage Vout of the power supply according to the basic equation Vout=1V(1+R3/R4) as described in the Elantec documentation. As described in the data sheet the resistor values specified by this equation need to be modified slightly to compensate for nonideal behavior of the device using various graphs supplied in the data sheet. FIG. 8 shows an inventive modification to the Elantec standard connection diagram in which a programmable analog switch is used to allow a set of digital control signals to select of R3 and R4 thus creating a programmable power supply with a fixed number of preset output voltages. For the sake of clarity, FIG. 8 does not show the many passive components in the standard Elantec connection diagram, only the inventive circuitry concerned with programmability. These remaining passive components as described by Elantec must, of course, be included in the actual circuitry implemented if the EL7556BC is to operate correctly.

In FIG. 8, the R3 and R4 resistors in the Elantec connection diagram are replaced by eight sets of resistors and an 8 to 1 analog multiplexer which connects one of these sets of ratioed resistors to the FB1 input of the EL7556BC DC—DC converter. In a preferred embodiment, the analog multiplexing function is implemented using a MAX4598 integrated circuit as described in the document "MAX4598 Low-Voltage, Combination Single-Ended 8-to-1/ Differential 4-to-1 Multiplexer," 19–1385; Rev. 0, October 1998 available from Maxim Integrated Products, 120 San Gabriel Drive, Sunnyvale, Calif. 94086 which is incorporated by reference.

Referring now to FIG. 8 and the standard connection diagram in the EL7556BC datasheet, under the control of selection signals Sel[0:2] one set of the eight possible sets of resistors takes the place of R3 and R4 causing a particular voltage to be output by the EL7556BC and its associated circuitry on signal Vout. Signal Vout is also connected to the resistors and signal FB2 on the EL7556BC as shown in FIG. 8. Signal Vin on the Elantec connection diagram is connected to the externally supplied power supply Vboard. The EL7556BC also provides signals indicating overtemperature (OT) and Power Good (PWRGD), these signals are coupled to the power control circuitry shown in FIG. 10 to ensure that the DC—DC converter chip is not damaged by overheating and to determine at the system level that the FPGAs are receiving the required power supply voltages.

Figure 10:
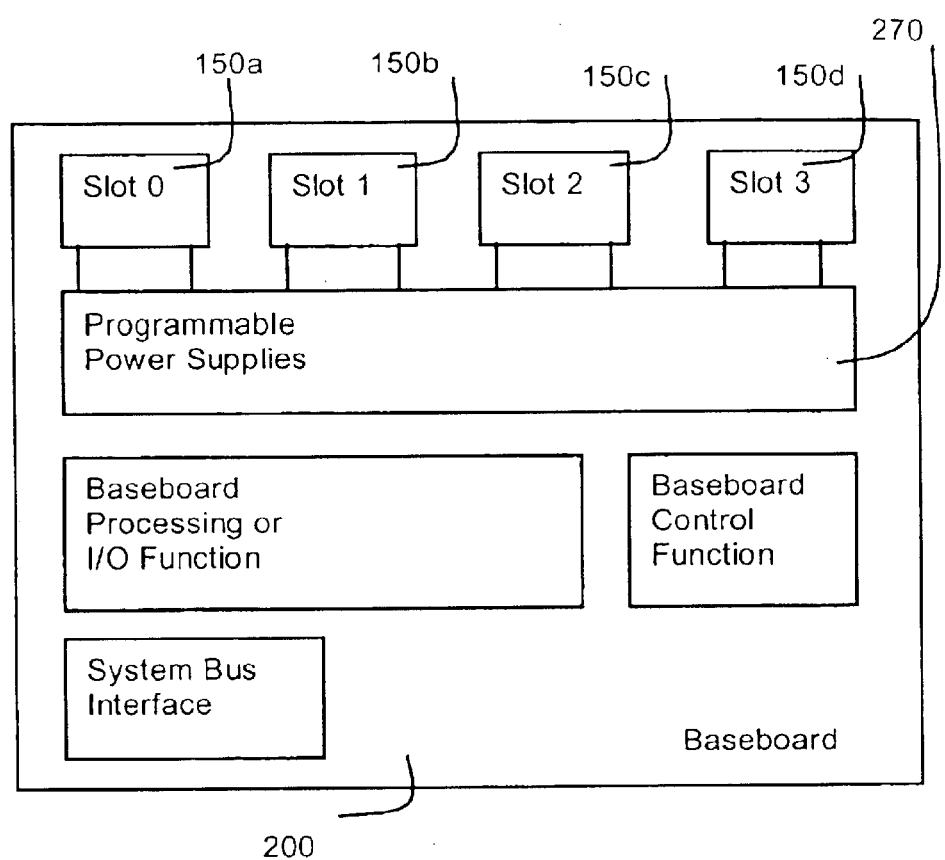
FIG. 10 shows a third baseboard containing programmable power supplies for use with modular boards containing FPGAs.

In a presently preferred implementation, the eight possible power supply voltages corresponding to the 8 sets of resistors on FIG. 10 are shown in table 1 below.

TABLE 1

| Option | Voltage |
|--------|---------|
| 0 | 1 V |
| 1 | 1.1 V |
| 2 | 1.2 V |
| 3 | 1.3 V |
| 4 | 1.5 V |
| 5 | 1.8 V |
| 6 | 2.5 V |
| 7 | 3.3 V |

As shown in FIG. 8 the connections for the option 0, 1 volt output voltage does not involve resistors. In this case, the direct connection between the NO1 input of the analog multiplexer and Vout corresponds to R3=0 ohms and the no-connect between N01 and ground to R4 having a very high value. Using the equation Vout=1V(1+R3/R4) one can see that this configuration will cause the expected 1-volt output voltage. Some of the resistor values on FIG. 8 are not standard values, in this case they can be built using multiple standard values in series: for example the 232 ohm resistor can be built from a 220 ohm and a 12 ohm resistor in series. Preferably, 1 percent tolerance resistors are used to ensure an accurate output voltage.

One possible error condition that might occur in practice and is of concern is that a board might be assembled in which the control CPLD was not programmed. In this case the control connections to the power supply will not be driven by the CPLD and will "float." To prevent damage to expensive FPGA components it is important to ensure that the power supply will either be disabled or output the minimum voltage in this situation. One way of achieving this is to use a pull-down resistor on the POWER_ON signal so that if the CPLD does not drive this signal it will be pulled low and the power supply will be disabled.

Power Controller

Figure 9:
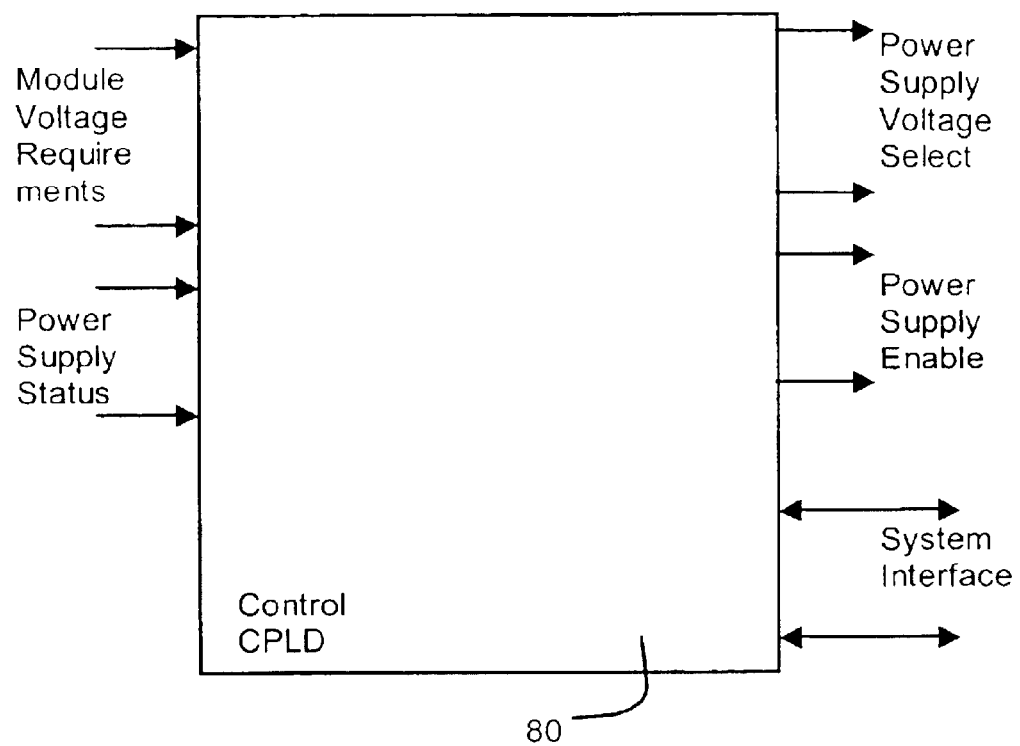
FIG. 9 shows a control circuit for programmable power supplies for use with modular boards containing FPGAs.

FIG. 9 shows an interface diagram for a preferred embodiment of a power controller 80 for use with this invention. In this embodiment the controller is implemented using an XC9572XL CPLD from Xilinx Inc. and controls the group of power supplies associated with one module slot. In this diagram logical input/output ports on the power controller are indicated by annotation in between arrowed lines: each of these ports involves multiple physical wires. For example, in the preferred embodiment there are four power supply enable connections.

There are many ways of implementing and partitioning the power control function between chips. For example, a single controller might control all the power supplies on the motherboard. Using a different controller for each power supply minimizes the pin requirements and allows use of low cost CPLDs. Other implementation technologies such as FPGAs and microcontrollers could also be used to implement the power supply control function as will be clear to one skilled in the art. In some system designs, the power supply control function might be cost effectively located on the same chip as other functions, for example, to take advantage of excess logic capacity.

The power supply controller is coupled to several sets of signals as shown in FIG. 9. Module voltage requirements are specified to the control circuitry by the modules through pins on the module connector. In a preferred scheme, each distinct power supply voltage is specified by a four-bit bus, allowing sixteen possible voltage levels to be specified. In the case where four programmable power supply voltages are provided to the module this requires sixteen pins on the module connector.

Although the module standard allows for sixteen possible voltages encoded in a four-bit field, the actual power supplies in the embodiment described in the previous section only allow for eight possible voltages encoded by a three-bit field. The translation between the four-bit code and the three-bit code is effected by the control CPLD. Providing additional voltage codes, which are currently not used allows the module standard to support future generations of FPGAs with lower power supply requirements and make use of improved power supply components as they become available. Codes 0 through 7 correspond to power supply voltages as shown in the table in the previous section, codes 8 through 14 are reserved and may be used in the future as supply voltages scale lower. Preferably, reserved codes disable the power supply so that if a new module which specifies a power supply voltage using a code previously defined as reserved and not supported by older motherboards is inserted into an older motherboard FPGA chips on the module will not be damaged by overvoltage. Code 15 will be present when the input signals on the CPLD float high because a module is not inserted and is therefore specified to disable the power supply.

TABLE 2

| Option | Meaning |
| --- | --- |
| 8 | Reserved |
| 9 | Reserved |
| 10 | Reserved |
| 11 | Reserved |
| 12 | Reserved |
| 13 | Reserved |
| 14 | Reserved |
| 15 | Disable Power Supply |

An additional failsafe aspect of the proposed coding of power supply voltages is of interest: should a connection between a module and the baseboard not make good electrical contact the corresponding signal will float high causing an incorrect higher code to be detected by the control CPLD. With this coding higher numbers correspond to lower voltages, therefore if this fault occurs FPGA chips on the module will not be subjected to overvoltage.

Future implementations of power supply control circuitry and associated encoding schemes might allow for modules to specify current requirements as well as voltage requirements to the controller.

The power supply controller is also coupled to power supply status signals from each individual power supply. In FIG. 8, signals PWR_GOOD and OVER_TEMP, respectively indicating that the power supply output voltage is correctly regulated and that the voltage regulator is becoming overheated are examples of power supply status signals that would be fed to the power supply controller. If a different voltage regulator chip was chosen then there might well be different status signals.

The power supply controller generates separate power supply enable signals for each programmable power supply, in FIG. 8 the enable signal is PWR_ON. In the event of an error condition (such as over temperature) being detected the power supply controller can disable some or all power supplies to prevent damage.

Power supply voltage select signals from the power supply controller are coupled to the various programmable power supplies. In the power supply of FIG. 8, each supply requires a 3 bit control signal labeled Sel[0:2], thus a controller for four power supplies needs to output 12 bits of voltage select signals in total.

Finally, the power supply controller might have a system interface to communicate with control or operating system software in a larger system. For example, it might be desirable for the host system to be able to place the FPGA modules into a power saving mode. As another example it might be useful for the controller to report error conditions to the host system so that it could display messages for the human operator.

In a preferred implementation status light emitting diodes (LEDs), not shown in FIG. 9, driven by the power supply control circuitry are placed on the printed circuit board to indicate whether the individual power supplies are operating correctly.

Shared Power Supplies on Motherboard

Figure 11:
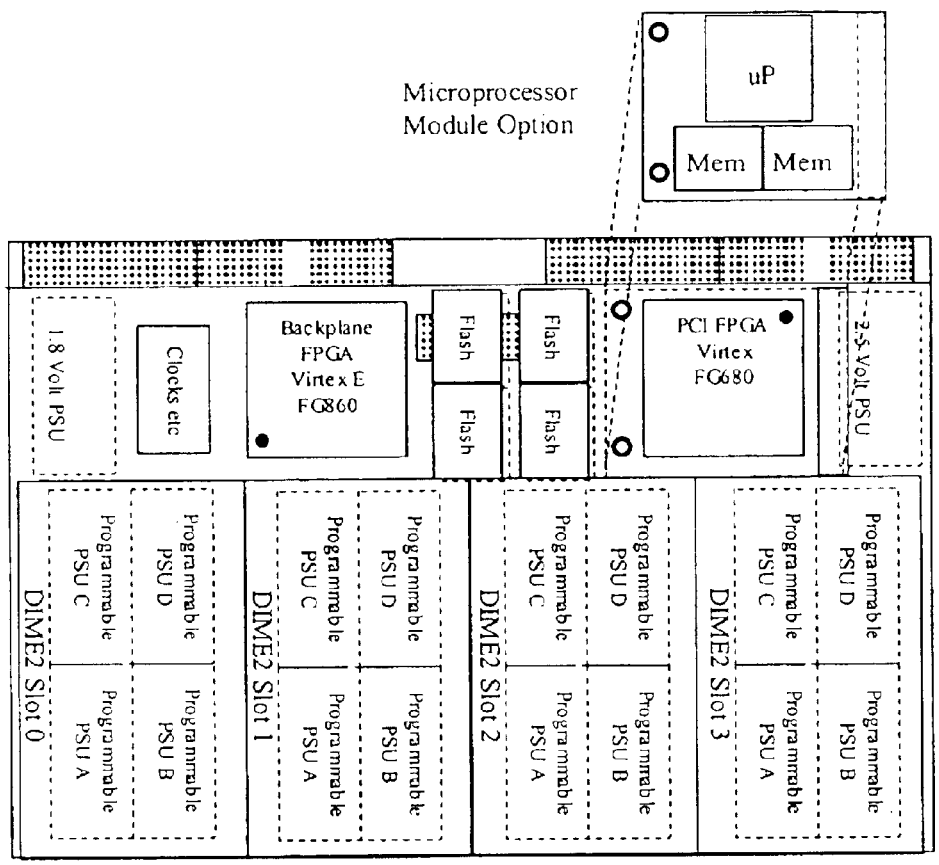
FIG. 11 shows a board layout for an exemplary baseboard.

In the presently preferred embodiment of the invention as shown in FIG. 7 each modular daughtercard has a corresponding set of programmable power supplies such that each power supply is associated with a single daughtercard. FIG. 11 shows a more detailed board layout for a baseboard generally corresponding to the architecture of FIG. 7. It is clear that a large fraction of the baseboard area is devoted to power supplies in order to provide four programmable power supplies to each DIME2 module slot. DIME2 is a module format developed by Nallatech Ltd., the assignee of the present invention.

Referring now to FIG. 10, in an alternative embodiment programmable power supplies may be shared amongst multiple daughtercards. Many variations are possible: for example each power supply may be connected to every daughtercard or some power supplies may be assigned to a single daughtercard and some connected to several or all daughtercards. The advantage of sharing power supplies between multiple daughtercards is reduced cost and board area for power supplies. The disadvantage is reduced flexibility and the need for modules to be designed to allow sharing of power supplies.

Where power supplies are shared between modules the power supply control function (contained within the programmable power supplies 270) on the baseboard receives power supply requirements information from several modules connected to shared supplies and determines if it is compatible. In the simplest case this involves determining that all modules sharing the power supply are requesting the same power supply voltage. In a more complex case modules might specify several acceptable power supply voltages and the controller must determine if there is a single voltage acceptable to all modules sharing the supply.

Specifying a range of power supply options is most practical when modules use a serial EPROM rather than fixed links or switches to indicate their power supply requirements since in this case a relatively large amount of data can be transferred over a small number of connector pins. Where modules specify a range of power supply options, it is attractive to provide additional status signals from the power supply controller to the module indicating which, if any, of the options has been provided. As the algorithms become more complex, it becomes increasingly attractive to use a microcontroller to implement the power supply control circuitry.

In the case where a power supply control circuit cannot determine an output voltage acceptable to all modules sharing their supply then they will disable the supply. In some circumstances chips can be damaged by having some, but not all of their power supplies active. Further, it is generally not desirable to connect outputs from correctly powered circuits to unpowered circuits. The exact topologies which can cause problems vary according to the FPGA product family: since careful design of the FPGA I/O structures can reduce the potential for problems.

If a single power supply must be disabled a simple and cautious approach is to disable all the power supplies on the baseboard: this approach allows implementation of the power controller in a CPLD. Alternatively, if the baseboard power controller is implemented using a microcontroller, software might be designed with the goal of only disabling power supplies when absolutely necessary to prevent damage based on a model of potential problems and the interconnections between FPGAs.

Where power supplies are shared between modules and modules use a serial EPROM to communicate power supply requirements it may be attractive to communicate current as well as voltage requirements to the control circuitry so that the controller can determine if the total power supply requirements of the modules is within the capability of the supply.

In one embodiment, in order to make it more likely that modules will be able to share power supplies by convention the module power supply inputs are ordered in voltage level. Thus, referring to FIG. 11 the voltage to be output by programmable power supply A is guaranteed to be greater than or equal to that output by programmable power supply B which is in turn greater than or equal to that output by programmable power supply C and so on. Thus, in the case of two modules whose highest power supply voltage is 1.8 volt, both modules will require that voltage from programmable power supply A and it will be possible to share programmable power supply A between the modules.

Physical Aspects

Figure 12:
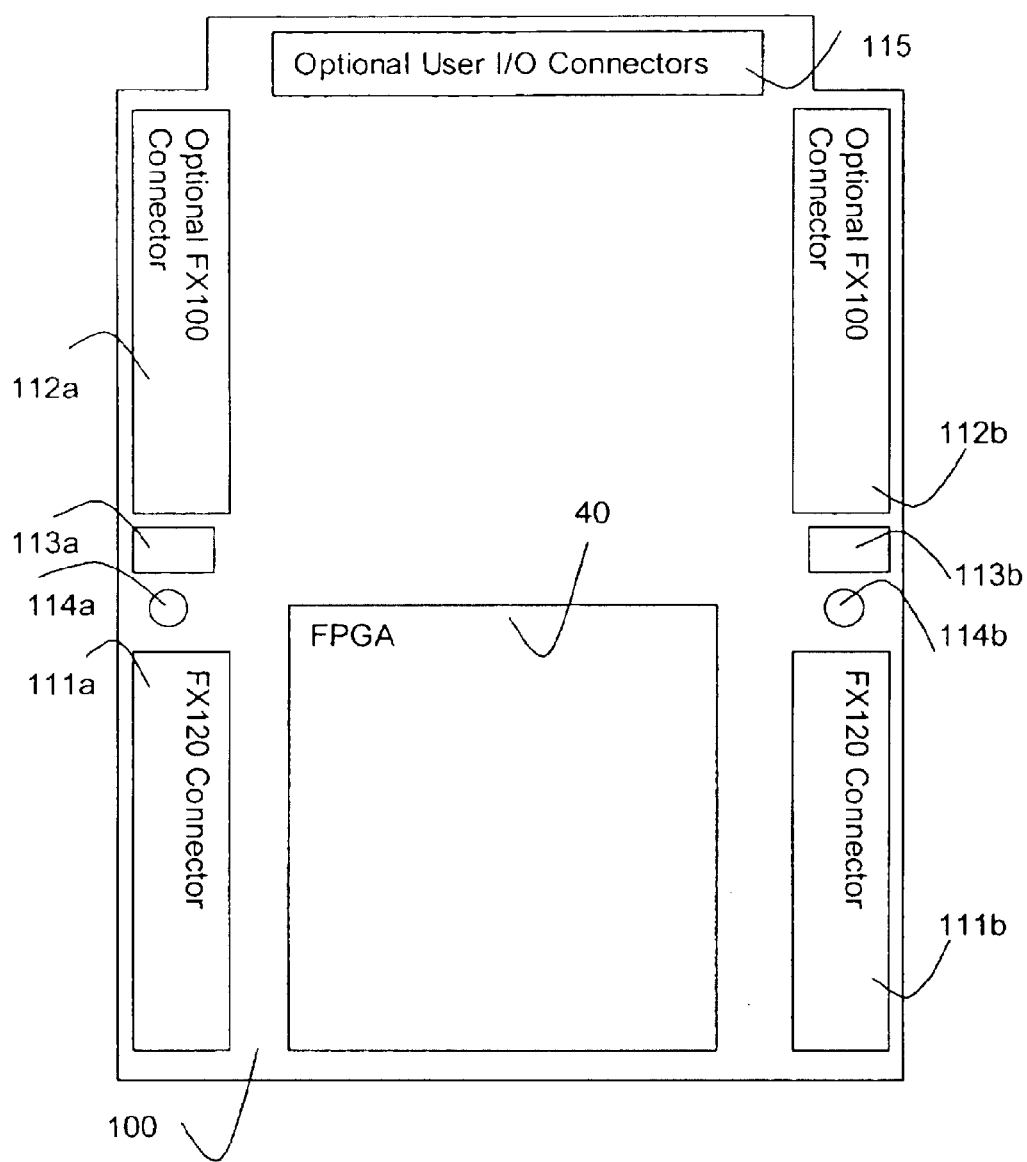
FIG. 12 shows a board layout for an exemplary module board.

In a preferred embodiment baseboard to module connector 110 is composed of several physical connectors. FIG. 12 shows the physical connectors associated with a DIME2 module according to an embodiment of this invention. The width of the module is specified to provide a clear area of 42.5×42.5 millimeters allow an FPGA 40 in an FG860 package (fine pitch 860 pin ball grid array package—FPGA packages are documented in the Xilinx product literature) to be mounted between the primary connectors. Additional user I/O connectors 115 as required for a particular application, for example miniature video connectors, can be placed on the top edge of the module. The module to baseboard connectors can be grouped according to their current carrying capability.

Figure 13:
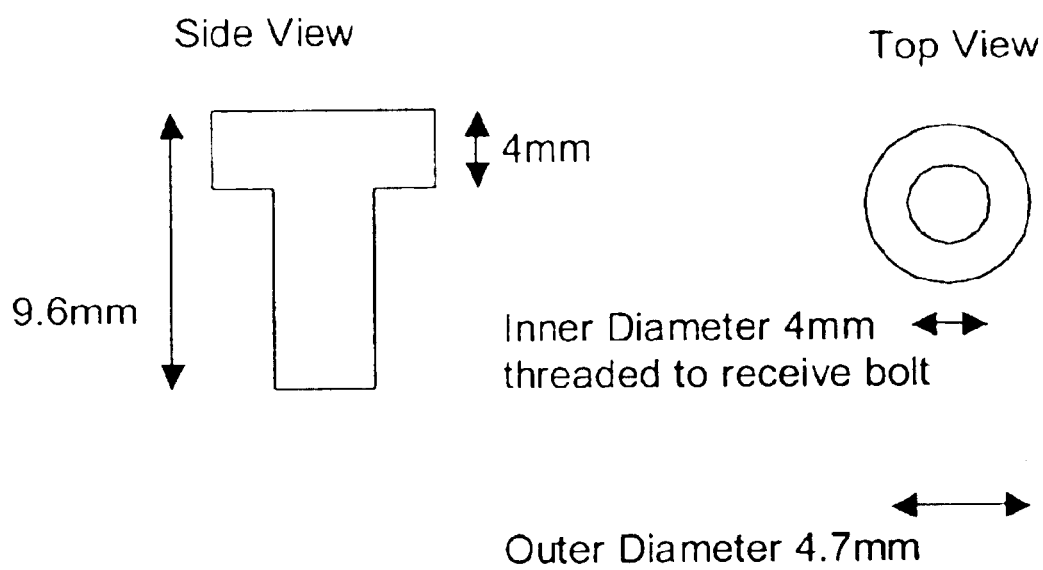
FIG. 13 shows a mechanical drawing of a standoff pillar for fixing module boards to baseboards.

Two conductive standoff pillars 114a and 114b are provided in the middle of the module to provide mechanical stability and provide a low resistance ground connection. This combination of mechanical and electrical functions in a single component saves board area. FIG. 13 shows a mechanical drawing of a suitable pillar which is preferably made from brass. The base of the pillar is soldered to the baseboard. The top of the standoff is machined to take a conductive bolt which secures the module to the top of the pillar providing good electrical contact. If a suitable washer is used between the module PCB and each of the standoffs the action of unscrewing the bolts will separate the module from the motherboard. This technique for separating the boards applies force gradually and evenly in the center of the board and is much less likely to cause damage to the many pins in the data connectors than simply prizing the boards apart.

Higher current power supply signals are transferred from the four programmable power supplies PSU A, PSU B, PSU C, and PSU D of FIG. 11 are transferred on two 6-pin connectors 113a and 113b. These are standard 2 millimeter pitch header connectors available from Harwin Ltd. and many other vendors. Three connector pins are available for each power supply so that high currents can be transferred.

Data, control, signal ground, and low current power supplies are transferred using FX10 series header connectors from Hirose Electric of Tokyo, Japan, with ground plates removed. Similar connectors are available from many other vendors. A 144 pin primary connector composed of two Hirose FX10–120 connectors 111a and 111b with 72 pins each transfers essential signals required by all modules and an optional 120 pin secondary connector composed of two Hirose FX10–100 connectors 112a and 112b is provided for modules with greater I/O requirements.

Low current power supplies include +5 volt, −5 volt, +12 volt, and −12 volt supplies for use by analog circuits on the module. Control signals include power supply control signals and JTAG chains for configuring the FPGAs as well as clock and reset signals and a data bus. The majority of the pins are used for general purpose (uncommitted) I/O connections between FPGAs and associated ground returns. Since the DIME2 modules are intended to support up to 200 megahertz communication between FPGAs signal integrity is an important concern and large numbers of ground connections are required.

It should be noted that although the physical aspects of the DIME2 module have been disclosed in detail above this is provided only as an example in order to clarify the teachings of this invention and is not intended to limit the scope of the invention. Many variations on the embodiment disclosed in this section will immediately be apparent to one skilled in the art.

Adaptive Choice of Power Supply Voltage

Normally the power supply and reference voltages for integrated circuits are fixed by the manufacturer of the integrated circuit: for example, early generations of FPGAs run off fixed 5-volt power supplies. More recent FPGAs have allowed various banks of I/O cells and the core to operate off different supply and reference voltages. Users can now choose when designing the system containing the FPGA which reference and supply voltage a particular bank of I/Os will use.

A further degree of flexibility would be provided if the determination of voltage levels was not fixed at design time but was negotiated during system operation. Flexibility is particularly advantageous in a modular system where modules may be supplied by third party vendors and combined in unpredictable ways to form a complete design. The lifespan of module standards is such that older modules may be connected to and must operate with modules which were designed many years later. Negotiation of signaling voltage levels and signaling standards would allow communicating FPGA chips to determine the optimal interface which was supported by both communicating modules and the motherboard.

Where the goal is to determine the optimal signaling standard supported by the FPGAs which wish to communicate the negotiation need only take place when the configuration of the system is changed (for example when a new module is inserted onto the baseboard). However, it may be more convenient to repeat the negotiation every time power is applied to the system rather than preserve configuration information in nonvolatile memory. This kind of negotiation is analogous to the plug-and-play system used in personal computers to configure device driver software when new hardware is installed.

In some cases it may be desirable to go further and intelligently change the signaling scheme during normal operation of the equipment. An application of this capability would be to choose to use a lower power signaling scheme in order to reduce power consumption or to change to a more robust signaling scheme if the equipment detects corruption on the data being transferred. This kind of adaptive change of inter-FPGA signaling scheme in response to environmental conditions is particularly relevant to mobile or battery powered equipment and is not limited to use within modular systems.

When considering adaptive schemes for determining a suitable power supply voltage a "chicken and egg" problem occurs: the FPGA must be powered-on in order that it might implement the logic required for the scheme whereas the power supply circuitry requires to know the appropriate power supply voltages prior to powering on the FPGA. The solution is to provide power at predetermined levels to a minimal set of FPGA functions. This allows FPGA functionality sufficient to implement communications to be activated immediately. In the context of today's FPGAs this would mean the core power supply and the power supplies associated with pins concerned with device configuration and a small number of essential user I/Os which communicate power supply requirements. The signaling scheme and voltage levels for these I/Os must be predetermined in the module standard. For example, low voltage TTL (LVTTL) signaling might be specified.

Once these power supplies are in place the FPGA can be configured and negotiate with other FPGAs it must transfer information with and the power supply control circuitry in order to determine appropriate power supplies and reference voltages for the remainder of its pins. It might also determine better supply voltages for the core logic and the initial set of I/Os are reprogram the power supply accordingly.

Figure 14:
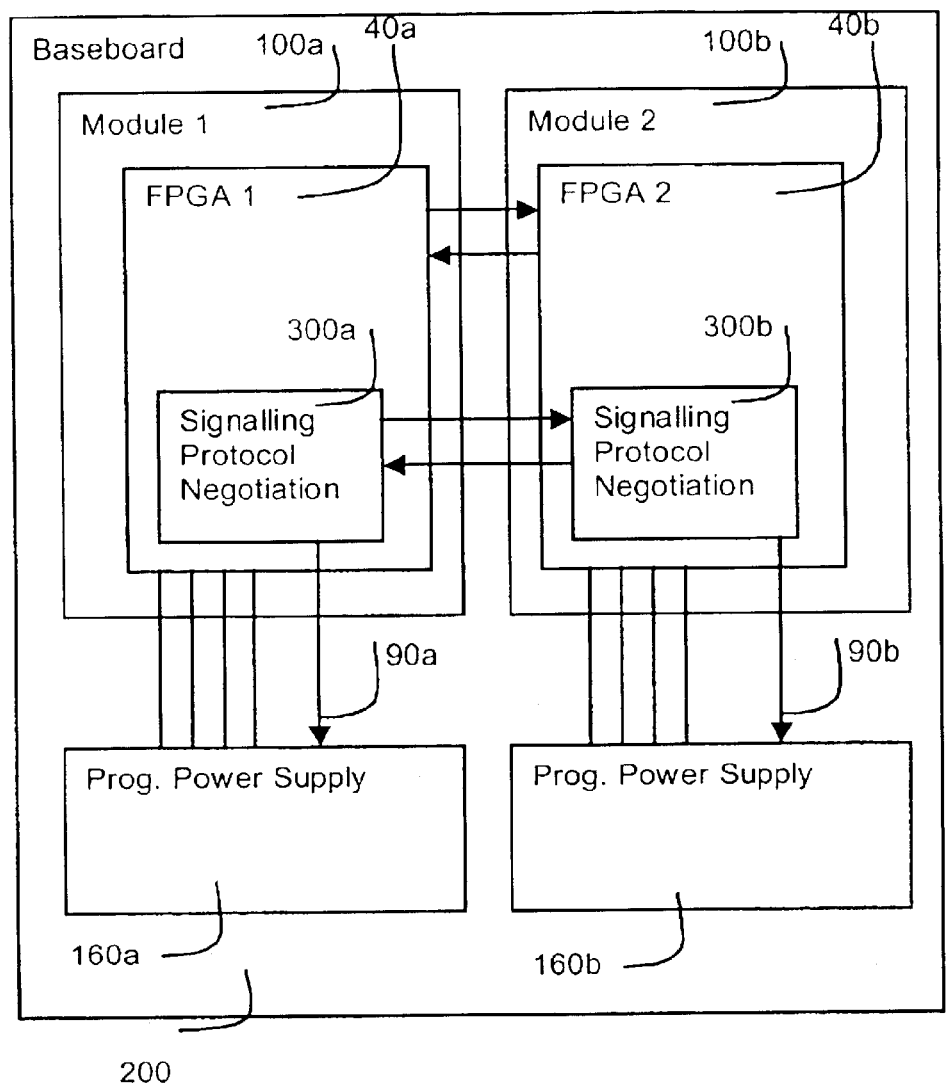
FIG. 14 shows a system in which FPGAs on module boards negotiate a suitable signaling protocol and signaling voltage levels.

FIG. 14 is a simplified diagram of a system in which two FPGAs 40a and 40b mounted on modules 100a and 100b on the same baseboard 200 negotiate mutually acceptable signaling voltages and protocols and configure the programmable power supplies 160a and 160b accordingly. User circuitry 300a and 300b are configured onto the FPGAs is responsible for implementing the protocol negotiations.

When power is initially applied to the module programmable power supplies 160a and 160b provide core voltage and I/O voltage to those pins required by the signaling protocol negotiation and configuration circuitry only. In order to carry out these negotiations connections between circuits 300a and 300b use a predetermined signaling convention—for example LVTTL. The user designs agree upon mutually acceptable signaling voltage levels and specify these to the programmable power supplies 160a and 160b using connections 90a and 90b. At this point the remaining I/Os on the FPGAs have operating power supply and reference voltages applied and normal operation of the system can proceed.

There are many possible ways of implementing the signaling negotiation protocol and the associated communication between FPGAs. The most obvious of these is to use logic gates in the user design and direct dedicated connections. Another possibility is to use reconfiguration of the FPGAs such that an initial configuration carries out the signal voltage negotiation and then selects a second configuration to be loaded into the device according to the outcome of the negotiation.

FPGAs have recently become available with on chip microcontrollers and in this case it might be advantageous to implement the negotiation in software. Given the ability to establish a communication path between the FPGAs it is straightforward to develop negotiation protocols to exchange capability information and determine an appropriate signaling standard. One such algorithm would establish a master/slave relationship between FPGAs at either end of the communications link. The slave FPGA would send the master FPGA a list of the potential signaling standards it could implement. The master FPGA would have a table of communications standards it could implement sorted in order of desirability (for example, standards using lower voltages might be preferred to reduce power consumption). The master FPGA would then go through its table of implementable standards in order from most desirable to least desirable until it found a standard which was also in the list sent from the slave FPGA. The first standard to match would be chosen for use in the link. The master FPGA would then inform the slave FPGA of the choice, configure its own I/Os accordingly and request the power control circuit to deliver the appropriate voltages. On the assumption that there is a "lowest-common-denominator" signaling standard (such as LVTTL) which can be used by all FPGAs a match will always be found by this algorithm.

This negotiation to determine appropriate signaling standards is analogous to negotiations between MODEMs used in dial-up networking to determine appropriate baud-rate and modulation schemes and to many other communications protocols. Many prior art algorithms could be adapted for use in this application and the simple algorithm outlined above is intended only as an example.

There are many different possible embodiments and variations to the embodiment shown in FIG. 14. For example, one master device may talk to a single slave device. Or, one master device may talk to multiple slave devices. Further, the master integrated circuit may be part of a module or independent of the modules. For example, the master may be part of the motherboard.

When the master determines which of the potential communication standards to use, the master will alter the power control signal in such a way to avoid damaging the integrated circuits, the master device or the slave device. When supplying an integrated circuit with a higher or different supply voltage from what it was designed to accept, the integrated circuit may be damaged. By varying the power control signal appropriately, the master device can prevent itself and other devices from being connected to supply voltages that would damage them.

In the discussion above it has been assumed that communication between the FPGAs to negotiate signaling levels takes place via dedicated point-to-point interconnect, other embodiments might support such communication using a system bus or by creating registers in the user design which can be accessed via memory references or by using the JTAG interface to readout special registers.

Similarly, although the voltage negotiation process has been described as a peer-to-peer negotiation between two FPGAs it is also possible to conceive of a centralized architecture in which a controller on the baseboard interrogated the FPGAs on all the daughterboards to determine their capabilities and then assigned appropriate signaling standards based on an algorithm such as that outlined above.

Advantages

This invention provides a power supply architecture for a module standard for implementing digital systems using FPGAs which allows users of module based equipment to take full advantage of the flexibility of modern FPGAs with regard to signaling voltages.

A further advantage is the ability to upgrade the system with new FPGAs based on more modern process technology and requiring lower power supply voltages and to implement systems that use FPGAs from several process generations.

A yet further advantage of one embodiment is that power supply circuitry is not itself located on the modules and thus does not have to be replaced if modules are upgraded. Since no board area on the modules is devoted to power supply circuitry the modules can contain more active processing circuitry than would otherwise be the case.

A further advantage of some embodiments is that signaling voltage levels for communication between FPGAs can be determined during system operation rather than fixed at the time modules are designed.

A further advantage is that voltage levels can be varied adaptively during system operation for example in order to conserve power in a battery-powered application.

While the description above contains many specific details, these should not be construed as limitations on the invention, but rather as an exemplification of one preferred embodiment thereof. Many other variations are possible.

Accordingly, the scope of the invention should be determined not by the embodiments illustrated but by the appended claims and their legal equivalents.

This description of specific embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications, which will enable others skilled in the art to best utilize the invention in various embodiments and with various modifications as are suited to the particular use contemplated. It is intended that the scope of the invention be defined by the following claims.

What is claimed is:

1. A method of operating an electronic system having an integrated circuit requiring a plurality of operating voltages comprising:
   providing a signal from the integrated circuit to power controller circuitry;
   decoding the signal using the power controller circuitry and generating first and second control signals;
   receiving the first control signal in a first programmable voltage generator, which generates a first voltage;
   receiving the second control signal in a second programmable voltage generator, which generates a second voltage, different from the first voltage; and
   providing the first and second voltages to the integrated circuit.

2. The method of claim 1 wherein the signal from the integrated circuit is in the form of a string of serial binary data.

3. The method of claim 1 wherein the integrated circuit is a field programmable gate array or programmable logic device.

4. The method of claim 1 herein the signal from the integrated circuit to power controller circuitry is a first value to provide higher performance and a second value to provide reduced power consumption.

5. The method of claim 1 wherein the signal from the integrated circuit to power controller circuitry varies depending on environmental conditions in which the electronic system is operating.

6. A method of operating an electronic system comprising:
   providing a first module, having a master integrated circuit, coupled to the electronic system;
   providing a second module, having a slave integrated circuit, coupled to the electronic system;
   determining a common communication standard usable by both the master and slave integrated circuits;
   transferring data from the master integrated circuit to a first programmable power supply to generate voltages for to configure the master integrated circuit to use the common communication standard; and
   transferring data from the slave integrated circuit to a second programmable power supply to generate voltages to configure the slave integrated circuit to use the common communication standard.

7. The method of claim 6 wherein the determining a common communication standard usable by both the master and slave integrated circuits comprises:
   sending from the slave integrated circuit to the master integrated circuit a list of potential communications standards acceptable by the slave integrated circuit;
   in the master integrated circuit, comparing the list of potential communications standards acceptable by the slave integrated circuit to a list of potential communications standards acceptable by the master integrated circuit;
   in the master integrated circuit, selecting from the list of potential communications standards acceptable by the master and slave integrated circuits the common communication standard usable by both the master and slave integrated circuits; and
   sending data from the master integrated circuit to the slave integrated circuit indicating that the common communication standard usable by both the master and slave integrated circuits should be used by the slave integrated circuit.

8. The method of claim 6 wherein the determining a common communication standard usable by both the master and slave integrated circuits comprises:
   in the master integrated circuit, comparing the list of potential communications standards acceptable by the slave integrated circuit to a list of potential communications standards acceptable by the master integrated circuit, wherein the master integrated circuit varies a power control signal so as to avoid damaging the master or slave integrated circuit.

9. A method of operating an electronic system comprising:
   providing a master integrated circuit coupled to the electronic system;
   providing a first module, having a first slave integrated circuit, coupled to the electronic system;
   determining a common communication standard usable by both the master and first slave integrated circuits;
   transferring data from the master integrated circuit to a first programmable power supply to generate voltages for to configure the master integrated circuit to use the common communication standard; and transferring data from the first slave integrated circuit to a second programmable power supply to generate voltages to configure the first slave integrated circuit to use the common communication standard.

10. The method of claim 9 further comprising:

providing a second module, having a second slave integrated circuit, coupled to the electronic system;

determining a common communication standard usable by both the master and second slave integrated circuits;

transferring data from the second slave integrated circuit to a third programmable power supply to generate voltages to configure the second slave integrated circuit to use the common communication standard.

11. The method of claim 9 wherein the master integrated circuit is in a third module, coupled to the electronic system.

12. The method of claim 9 wherein the master integrated circuit is on a motherboard of the electronic system.

13. A method of operating an electronic system having a first integrated circuit requiring a plurality of operating voltages comprising:

providing a signal from a second integrated circuit to power controller circuitry;

decoding the signal using the power controller circuitry and generating first and second control signals;

receiving the first control signal in a first programmable voltage generator, which generates a first voltage;

receiving the second control signal in a second programmable voltage generator, which generates a second voltage, different from the first voltage; and providing the first and second voltages to the first integrated circuit.

14. The method of claim 13 wherein the signal from the second integrated circuit is in the form of a string of serial binary data.

15. The method of claim 13 wherein the second integrated circuit comprises a programmable read-only memory (PROM), erasable programmable read-only memory (EPROM), electrically erasable programmable read-only memory (EEPROM), serial EEPROM, random access memory (RAM), dynamic random access memory (DRAM), or static random access memory (SRAM).

* * * * *